3,097,637
PELVIC MEASURING DEVICE
Robert R. Horton, St. Paul, Minn., assignor, by mesne assignments, to Wynlit Pharmaceuticals, Inc., Madison, N.J., a corporation of Delaware
Filed Nov. 28, 1961, Ser. No. 155,266
4 Claims. (Cl. 128—2)

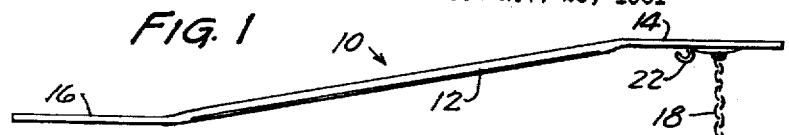
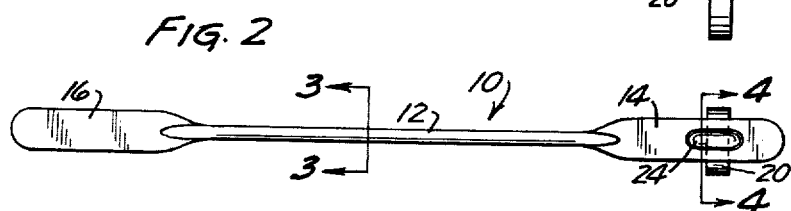
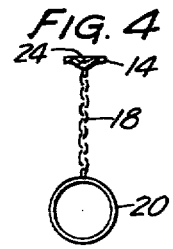
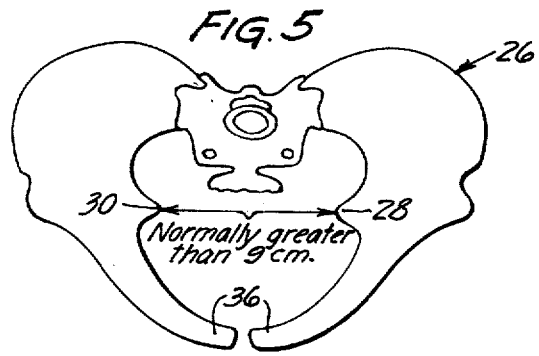
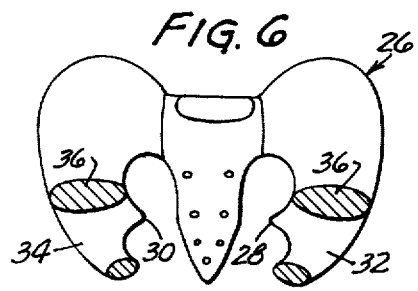
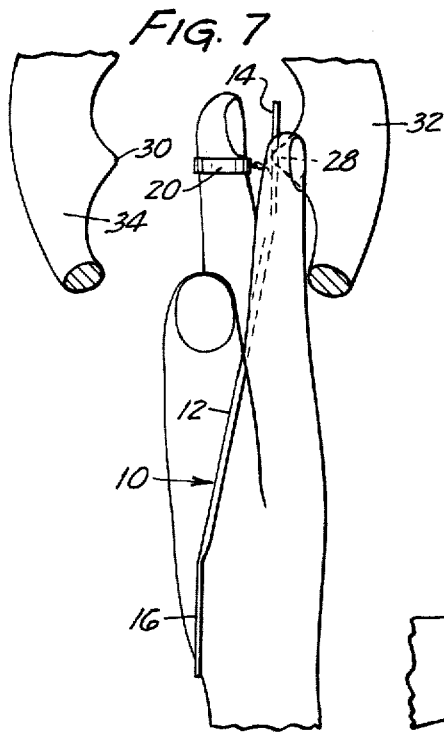
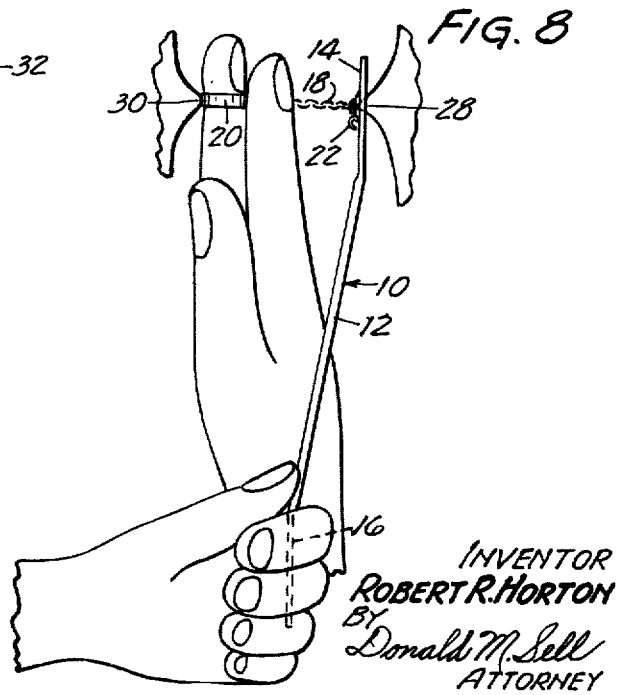
INVENTOR
ROBERT R. HORTON
BY Donald M. Sell
ATTORNEY

The present invention relates to a pelvimeter and more particularly relates to a device for measuring the diameter between the ischial spines of the female pelvis.

Before the onset of labor in a pregnant woman it is important that the physician or obstetrician detect abnormalities of the pelvis which may make the normal birth of the child hazardous or impossible. To this end it is essential that the obstetrician determine in his examination of a pregnant woman the existence and extent of any pelvic contraction by pelvic measurement of the woman.

The two clinical measurements most uniformly taken in detecting abnormalities which could interfere with normal childbirth are the diagonal conjugate measurement, which measures the distance from the promontory of the sacrum to the lower margin of the symphigsis pubis, and measurement of the distance between the ischial spines, this latter measurement being known by several names, i.e., the tuberischii diameter or T.I., the transverse diameter of the outlet, the bisischial diameter, and the intertuberous diameter. In accordance with the terminology used in "Williams Obstetrics," by Nicholson J. Eastman, 11th edition (1956), published by Appleton-Century-Crafts, Inc., New York, New York, this latter measurement will be referred to hereinafter as the tuberischii diameter, or T.I. The T.I. is significant mainly in that its measurement sometimes bears a relationship to the interspinous measurement of the mid-pelvis, i.e., the distance between the ischial spines. This latter measurement is now recognized as being clinically the most significant in the management of the obstetrical patient.

The device of this invention is adapted specifically for measurement of the interspinous distance of the midpelvis by internal measurement of the distance between the ischial spines. Present methods for the interspinous measurement are impractical except by X-ray pelvimetry.

It is the primary purpose of this invention to provide a measuring device with which to measure the distance between the ischial spines without resorting to X-ray examination. A further object is to provide a device readily insertable into the vagina and manipulable therewithin for engagement with one of the ischial spines; another object is to provide a device which may be readily retained within the vagina in engagement with an ischial spine from a position outside the vulva while the distance between the ischial spines is measured.

The foregoing, as well as other objects and advantages which will become apparent as the description proceeds, are attained by the device of this invention, a preferred embodiment of which is illustrated in the accompanying drawing wherein:

FIGURE 1 is a side elevational view of a device made in accordance with this invention;

FIGURE 2 is a top view of the device of FIGURE 1;

FIGURE 3 is a cross sectional view through the device taken substantially along the plane of section line 3—3 of FIGURE 2;

FIGURE 4 is a sectional view of the device from the front taken substantially along section line 4—4 of FIGURE 3;

FIGURE 5 is a top view of the female pelvis;

FIGURE 6 is a front view through the female pelvis with parts being broken away to more clearly display the ischial spines;

FIGURE 7 is a view of the device in place against one of the ischial spines of the pelvis as the device is inserted into the pelvis; and FIGURE 8 is a view similar to FIGURE 7 disclosing the manner in which the device is utilized to measure the distance between the ischial spines.

Referring now to the accompanying drawings in detail, the device is designated in its entirety by the numeral 10 and comprises an elongated thin, rigid stem 12 circular in cross section (FIGURE 3) having offset flattened end portions which are generally parallel to one another. One of these flattened end portions is considered the distal end portion 14 and the other the proximal end portion 16 of the device.

As is clearly apparent in FIGURES 2 and 3, the proximal and distal end portions are flat plate-like rectangles with smoothly rounded ends. Depending from the rear surface of the distal end portion 14 is a flexible element 18 in the form of a fixed length chain which has a finger grasping element in the form of a ring 20 at the free end thereof. This chain depends from a protuberance of the back surface of the distal end 14. As is apparent in FIGURES 2 and 4 particularly, the plate 14 has in its front surface a depression 24 for seating against one of the ischial spines of the female pelvis, and the chain depends from the protuberance formed on the back surface of this plate.

A top view of the female pelvis is illustrated in FIGURE 5 and designated generally by the numeral 26. The pelvis is shown only in sufficient detail to enable a clear understanding of the approximate position of the ischial spines, designated by the numerals 28 and 30 respectively in FIGURE 5, within the pelvic cavity. For normal childbirth, a distance between these spines of more than 9 centimeters is considered sufficient. In the event this distance is smaller than 9 centimeters normal delivery during childbirth may not be possible.

As is most apparent in FIGURE 6 each half of the pelvis is normally composed of 3 bones, the main large bones being known as the ischium (unnumbered) the pubis bones forming the pubic arch being designated by numeral 36 and the illium bones being designated by the numerals 32 and 34. From observation of the views of FIGURES 5 and 6 it can be observed that the ischial spines 28 and 30 occur as protuberances projecting within the pelvic cavity.

FIGURES 7 and 8 illustrate the manner in which the pelvic measuring device of this invention may be used. Thus, in FIGURE 7, the initial insertion and emplacement of the device is illustrated. For such emplacement, the stem 12 of the device is grasped between the index and middle fingers of the right (or left) hand and rested on the thumb of the right hand with the finger ring 20 being placed over the tip of either the index or middle finger. In the illustration shown it is over the middle finger of the hand. The device is inserted through the vagina and the ischial spine 28 is felt through the vaginal lining with the fingers. Upon locating the spine 28, the plate 14 is seated thereagainst so that the spine seats in the depression 24 of the plate. Upon such emplacement, the left hand of the user is used to grasp the proximal end 16 of the device which projects exteriorly of the vulva, the left hand then being utilized to maintain the distal end plate 14 seated against spine 28. Then, the right hand is moved across the vaginal wall toward the spine 30 on the other side. The chain 18 is of a fixed, predetermined length, usually 9 cm., from the inner surface of the depression 24 of the end plate 14 to the furthest outward surface of the finger ring 20. If the chain is stretched to its full extent before the spine 30 is reached, no further measurement is usually necessary as the distance is considered normal or larger than normal.

In the event the chain is not stretched to its full length upon engagement of the spine 30 by the finger ring 20, then, the device can be removed and the chain 18 taken up one or 2 links by hooking the links over the hook 22 on the back of the plate 14. Each of these chain links is of a specified length so that the chain is shortened up a predetermined amount. Then, the device is reinserted until the chain is stretched taut be- upon a truly accurate measurement of this distance is obtained.

This new pelvic measuring device enables ready and accurate internal measuring of the distance between ischial spines of the female pelvis. The elongated narrow rigid stem facilitates ready grasping between the fingers of one hand without bulk and the broadened plate- like end portion 14 at the distal end of the device with the seat 24 adapted to seat against one of the ischial spines enables ready emplacement and maintenance of emplacement of the device to carry out measurement. The flexible chain with the finger engaging element is readily stretched between spines by movement of the hand with which the device is inserted from the one spine toward the other. The proximal end of the stem of the device comprises a convenient grasping handle for retaining the distal end in engagement with the one spine as the stem is released by the inserting hand for extension of the flexible element between spines.

While a preferred embodiment of the invention has been illustrated, utilizing a finger ring and with the plate- like end portions being parallel and offset from one another, it will be readily apparent to those skilled in the art that other finger grasping means than a finger ring may be used and, in fact, a small T bar might actually be preferable since it will fit any finger. Like- wise, the offsetting of the end plates from one another, while convenient, is not really necessary to the opera- tion of the device. While the shape of the end plates is a desirable one here again there are other designs that would be effective. There is thus the possibility of considerable modification by those skilled in the art within the framework of this invention. However, the fore- going description will readily enable those skilled in the art to practice this invention.

I claim:

1. A device for internally measuring the distance be- tween ischial spines which comprises an elongated stem for insertion into the vagina, said stem terminating in a distal end portion adapted to bear against an ischial spine, a flexible element of fixed length attached to said distal end portion and having a finger manipulable member for extending said flexible element between the ischial spines, the proximal end portion of said stem being adapted to project exteriorly of the vagina for maintain- ing said distal end portion in position while said flexi- ble element is extended.

2. A pelvic measuring device for internally measur- ing the distance between the ischial spines of the female pelvis which device comprises an elongated narrow rigid stem for grasping between the fingers of one hand and terminating at its distal end in a broadened plate-like end portion the front surface of which is adapted for seating against one of said ischial spines, a flexible ele- ment fixedly attached at one end thereof to the back surface of said plate-like portion and having on its other end a finger engaging element to facilitate extending said flexible element between the ischial spines by movement of said one hand toward the other ischial spine, the proximal end of said stem comprising a grasping handle for retaining said distal end in engagement with said one spine as said stem is released for extension of said flexi- ble element between spines by said one hand.

3. A pelvic measuring device for internally measur- ing the distance between the ischial spines of the female pelvis comprising an elongated, rigid thin stem for grasp- ing between the fingers of one hand, an ischial spine engaging end portion on the distal end of said stem having a depression in the front face thereof for seating against an ischial spine, a flexible chain of fixed length attached at one of its ends to the back face of said plate- like end portion, a finger grasping element for said one hand at the other end of said chain for flexing said chain between ischial spines, a hand gripping portion on the proximal end of said stem for grasping by the other hand to retain said spine engaging end portion in place as said chain is flexed.

4. The device of claim 3 wherein said distal and proximal end portions are offset from one another and form broadened flat surfaced ends on said stem.

References Cited in the file of this patent
UNITED STATES PATENTS

| | | |
|---|---|---|
| 183,755 | Eckles | Oct. 31, 1876 |
| 309,483 | Millner | Dec. 16, 1884 |
| 1,856,295 | Sovatkin | May 3, 1932 |
| 2,507,959 | Chapman | May 16, 1950 |
| 3,023,502 | Vaughan | Mar. 6, 1962 |

UNITED STATES PATENT OFFICE

CERTIFICATE OF CORRECTION

Patent No. 3,097,637                                              July 16, 1963

Robert R. Horton

It is hereby certified that error appears in the above numbered patent requiring correction and that the said Letters Patent should read as corrected below.

In the grant, lines 2 and 3, for "Wynlit Pharmaceuticals, Inc., of Madison, New Jersey, a corporation of Delaware," read -- Unimed, Inc., a corporation of Delaware, --; line 12, for "Wynlit Pharmaceuticals, Inc., its successors" read -- Unimed, Inc., its successors --; in the heading to the printed specification, lines 4 and 5, for "Wynlit Pharmaceuticals, Inc., Madison, N. J., a corporation of Delaware" read -- Unimed, Inc., a corporation of Delaware --.

Signed and sealed this 3rd day of December 1963.

(SEAL)
Attest:
ERNEST W. SWIDER                                 EDWIN L. REYNOLDS Attesting Officer                                Acting Commissioner of Patents